United States Patent [19]

Staler et al.

[11] 4,453,119

[45] Jun. 5, 1984

[54] ELECTRICAL CHARGING CONTROL APPARATUS AND METHOD, AND SOLAR TO ELECTRICAL ENERGY CONVERSION APPARATUS INCORPORATING SUCH CHARGING CONTROL APPARATUS

[76] Inventors: Terry Staler, 18643 Collins St., Apt. 26, Tarzana, Calif. 91356; John W. Yerkes, 16562 Knollwood Dr., Granada Hills, Calif. 91344

[21] Appl. No.: 342,336

[22] Filed: Jan. 25, 1982

Related U.S. Application Data

[63] Continuation of Ser. No. 113,936, Jan. 21, 1980, abandoned.

[51] Int. Cl.³ .................................................. H02J 7/09
[52] U.S. Cl. ............................................. 320/39; 320/48
[58] Field of Search ........................................... 320/2-5, 320/30, 31, 39, 40, 61

[56] References Cited

U.S. PATENT DOCUMENTS

| | | | |
|---|---|---|---|
| 3,317,809 | 5/1967 | Bowers et al. | 320/30 |
| 3,350,618 | 10/1967 | Barney et al. | 320/5 |
| 3,483,416 | 12/1969 | Schaeffer | 320/31 |
| 3,522,507 | 8/1970 | Seiger | 320/31 |
| 3,867,681 | 2/1975 | Bishop et al. | 320/39 X |

FOREIGN PATENT DOCUMENTS

| | | | |
|---|---|---|---|
| 2020495 | 11/1979 | United Kingdom | 320/61 |
| 614497 | 7/1978 | U.S.S.R. | 323/15 |

Primary Examiner—William M. Shoop

[57] ABSTRACT

Electrical charging control apparatus regulates the charging of a rechargeable battery by a solar panel. The control of the charging is through a relay which when closed directly connects the output and charging terminal of the solar panel to the output and charging terminal of the battery to permit the charging of the battery by the solar panel. Such coupling is in turn under the control of signal-tester apparatus which prevents the coupling when the signals at the uncoupled terminals are in a coupling prevention relationship chosen to prevent significant discharging of the battery through the solar panel; of breaker apparatus which breaks a coupling after a predetermined period of time; and of additional signal-tester apparatus which causes a termination of the coupling when the signal at the connected terminals reaches a chosen charging termination threshold. The breaking of the coupling, which can result in a periodic breaking, permits the testing for discharging prevention. A charging control method is in accordance with the above outlined method of operation of the charging control apparatus.

32 Claims, 4 Drawing Figures

ELECTRICAL CHARGING CONTROL APPARATUS AND METHOD, AND SOLAR TO ELECTRICAL ENERGY CONVERSION APPARATUS INCORPORATING SUCH CHARGING CONTROL APPARATUS

This is a continuation of application Ser. No. 113,936 filed Jan. 21, 1980, and now abandoned.

FIELD OF THE INVENTION

This invention pertains to electrical charging control apparatus and methods, and also, to electrical energy conversion apparatus incorporating such charging control apparatus.

BACKGROUND OF THE INVENTION

Controlling the charging of a rechargeable electrical energy storage device, such as a rechargeable battery, by an electrical energy source for such charging is a requirement which is commonly encountered. However, the implementation of such control typically results in inconvenient control equipment and, in some cases, substantial effort by an operator.

The generally favored technique where the signal from the source is subject to substantial variation is the incorporation of a voltage regulator into the control apparatus to lower the voltage of the signal from the source to the approximate level of the fully charged voltage of the device. Then, as the device is charged, the current from the regulator to the device will decrease as the voltage of the device increases, and will be substantially terminated by the matched voltage levels when the device is fully charged.

Regulators of this type, however, can be quite large, and inconvenient as a result of their size and, in some cases, as a result of the heat they generate in dissipating excess energy from the source.

The above technique is, due to the regulation of the voltage level, essentially a constant voltage technique.

Generally viewed as less desirable, but also at times used, is what is substantially a constant current technique. For example, this technique may be implemented by providing a source with a voltage which is much greater than the fully charged voltage of the storage device. Disadvantages in this technique result from the lack of self-regulation and, for some applications, a need to adjust the current at certain stages in the charging process. Typically, the result is increased reliance on an operator with the attendant disadvantages thereof.

With the constant voltage approach, where the source voltage falls below the storage device voltage, to maintain the self-regulation, a mechanism must be employed to in effect uncouple the source from the device when this occurs. This is typically accomplished through a solenoid switch mechanism or, alternatively, by a back-up prevention diode.

In the last few years, with increased experimentation and usage of solar energy, attempts have been made to implement charging control in the context of the charging of a device, such as a rechargeable battery, by a solar panel. Such implementation typically provides a shunt regulator (in parallel with the solar panel) to provide essentially a constant voltage, and a self-regulating situation in the charging mode. Where large currents are generated by the solar panel, regulating apparatus of this type can be exceedingly large and create large amounts of heat. The avoidance of discharging, through the solar panel, when the panel does not even provide enough voltage for the regulator to reach the level of the storage device, is typically implemented through the connection of a diode between the regulator output and the storage device. However, the sacrifice of solar energy by the voltage drop across the diode in the charging mode is a substantial concern, particularly in light of the marginal commercial viability of the employment of solar energy in many applications.

The present invention eliminates the need for voltage regulation of the output of a solar panel which is used to charge an energy storage device. It, in addition, eliminates the energy sacrifice resulting from the utilization of a diode to prevent back-up. Beyond this, in the more general context of the charging of an energy storage device by an energy source, it provides essentially self-regulating control in what is substantially a constant current type charging situation, not predicated on energy dissipation.

In accordance with the invention, apparatus is provided for controlling the charging of a rechargeable electrical energy storage device for providing a storage device electrical signal, by an electrical energy source foer providing a source electrical signal, which source has a charging output terminal and which device has a charging input terminal. Such apparatus, in accordance with the invention, includes: relay means for electrically coupling the charging output terminal of the source and the charging input terminal of the device; signal-testing means coupled to the relay means for receiving the storage device electrical signal and the source electrical signal and for providing an electrical output signal for permitting and preventing such coupling in response to such signals; relay breaker means coupled to the relay means for providing an electrical breaker signal for breaking such coupling after such coupling for a predetermined period of time; and relay driver means coupled to said relay means for providing an electrical control signal for controlling such coupling in response to the output signal of the signal-testing means and the relay breaker signal.

The relay means may include a switch for directly connecting the charging input terminal of the storage device and the charging output terminal of the source. Also, the controlling of the coupling may include reestablishing the coupling in response to the output signal of the signal-testing means upon the breaking of the coupling, with such breaking occurring during the above permitting by the output signal of the signal-testing means. Further, the apparatus may include additional signal-testing means for receiving the storage device electrical signal and for providing an output signal for terminating the coupling in response to the storage device electrical signal, with such terminating occurring during the above permitting by the output signal of the signal-testing means.

In accordance with other apparatus aspects of the invention, the charging control apparatus may be incorporated into a solar to electrical energy conversion apparatus which includes a solar panel as an electrical energy source, and a rechargeable electrical energy storage device which is charged by the solar panel.

Charging control methods, in accordance with the invention, are directed to the methods of operation of the charging control apparatus, including electronic methods, which can be long-term without human intervention.

DETAILED DESCRIPTION

Figures 1, 3:
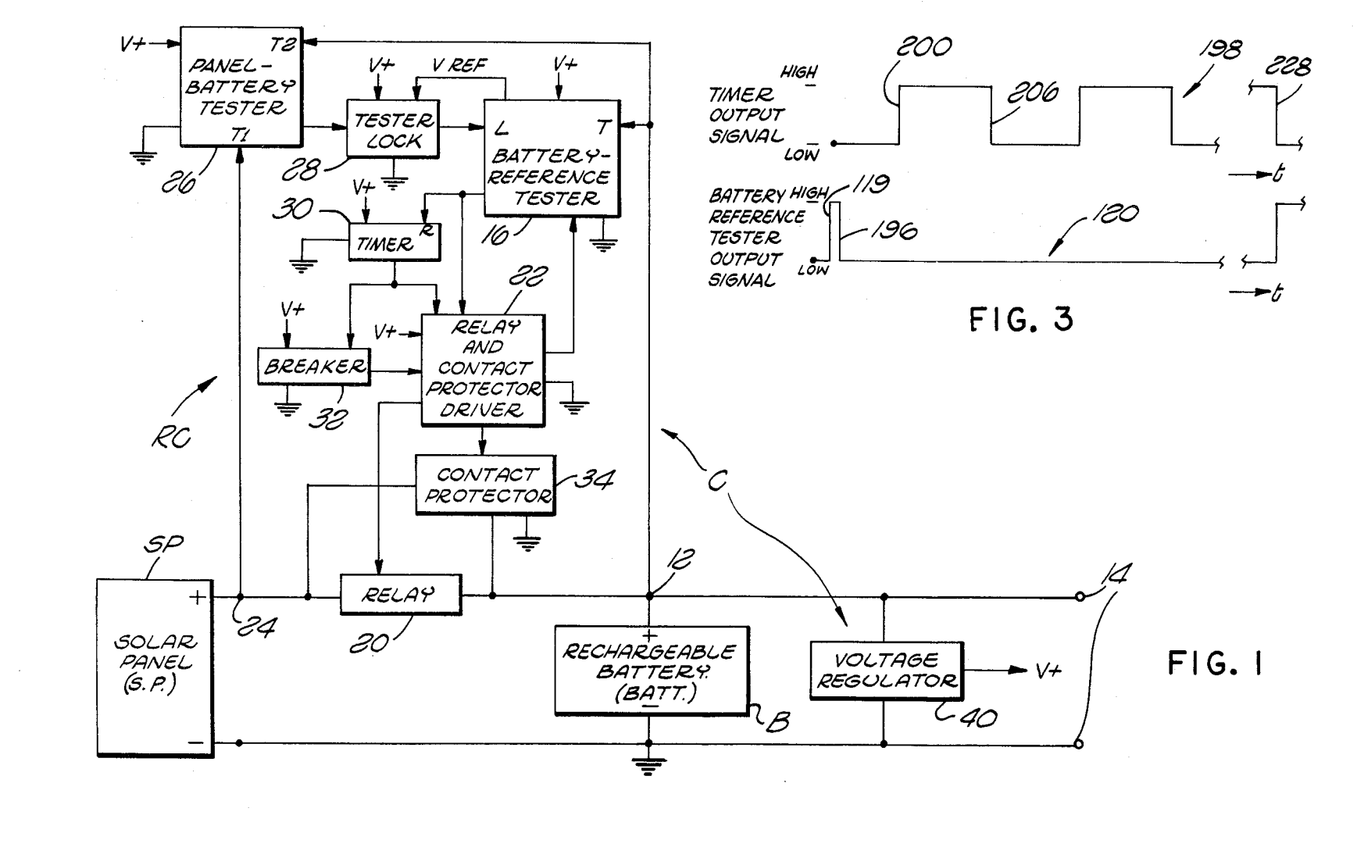
FIG. 1 is a block diagram of solar to electrical energy conversion apparatus in accordance with the invention.
FIG. 3 is an illustrative timing diagram useful in understanding the energy conversion and charging control apparatus of FIGS. 1 and 2.

The solar to electrical energy conversion apparatus of FIG. 1 incorporates the apparatus aspects of the invention and operates in accordance with the method aspects of the invention. Summarly, it incorporates a solar panel SP of a type well known and commonly used which, under the control of charging control apparatus C, interacts with a rechargeable battery B, to charge the battery when and to the extent the control apparatus C indicates such charging is to occur. The battery also is of a type that is well-known, and could well be a common lead-acid (car) battery. The battery B, at its output and charging terminal 12, generates, at times in association with the solar panel SP, a battery output signal. This signal would typically be provided to a load (not shown) at output terminals 14 of the conversion apparatus, to power the load.

By testing the voltage level of this battery output signal against the voltage level of an internally generated reference electrical signal, a battery-reference tester 16 will cause a relay 20 to open when, during charging, the voltage level of the battery output signal indicates that a chosen charging termination threshold has been reached. This threshold is preferably chosen as the expected voltage at the output and charging terminal 12 of the battery, when the battery is fully charged and the panel is providing a current indicative of early morning or late afternoon sunshine. This, due to the nature of the charging process, will cause such an opening, for example during midday sunshine, while the battery is not yet fully charged. But in the context of long-term operation, this has been determined to be a convenient and appropriate approach to regulation. The tester 16 accomplishes this through relay controller apparatus RC; and, in particular, through a relay and contact protector driver 22 which controls the opening and closing of the relay. The relay 20 incorporates a switch, which, when closed, directly connects the solar panel output and charging terminal 24 to the comparable terminal 12 of the battery B. Thus, the relay 20 does not incorporate a device such as a resistor to electrically separate such terminals of the solar panel and rechargeable battery.

Even if the chosen charging termination threshold has not been reached, for example, at night, there may be insufficient solar power incident on the solar panel to provide a voltage at the output and charging terminal 24 of the solar panel SP sufficient to force a charging current into the battery B through the closed relay 20. To avoid significant discharging of the battery through the solar panel in such a situation, a panel-battery tester 26 provides an output signal which will cause the relay to be locked in the open position as such a situation is occurring. This is accomplished through a tester lock 28 which, through an input signal to the battery-reference tester 16, can override the testing function of that tester, and cause the relay to be locked in the open position. Again, this relay control is accomplished through the interaction of the battery-reference tester 16 and the relay and contact protector driver 22.

Where the relay 20 is opened by an increasing voltage level at the coupled output and charging terminal 12 of the battery B, concurrently with the action by the battery-reference tester 16 to cause the opening of the relay, the tester also sets a timer 30. The timer 30 will then cause the relay and contact protector driver 22 to close the relay after the passage of a set time interval following such opening of the relay, so that the charging of the battery may be resumed after such interval in the event the voltage level at the coupled output and charging terminal 12 of the battery B has fallen below the charging termination threshold and the battery-reference comparator 16, therefore, will allow the relay 20 to remain closed. The occurrence of this closing assumes the panel-battery tester 26 has not caused the relay to be locked open during the interval.

Following such a re-closing, in the event the relay stays closed for an extended period of time, the timer 30, through an interaction with a relay breaker 32, which in turn interacts with the relay and contact protector driver 22, will cause the relay to open at the end of a predetermined interval after such re-closing. This opening is to accomplish an uncoupling of the output and charging terminals of the solar panel and rechargeable battery 24 and 12, to permit the testing by the panel-battery tester 26, which testing is only effective absent the connection of such terminals.

That this testing is effective only absent such connection is readily apparent from the fact that the relay 20, when closed, directly connects the output and charging terminals 24 and 12 of the solar panel and rechargeable battery, thus causing such terminals to be at the same voltage. Along these lines, as a result of the well-understood nature of the charging of a conventional battery, and such a battery's interaction with the other apparatus herein, including a conventional solar panel, as the battery B is being charged by the solar panel SP near the charging termination threshold voltage, the voltage level at the connected solar panel and battery output and charging terminals 24 and 12 will be at some identical voltage level between what the uncoupled voltages at these terminals would be. However, upon a disconnection of such terminals, to terminate such charging, the battery, absent the charging current from the solar panel, will immediately drop to a somewhat lower uncoupled voltage level, and the solar panel, as a result of the absence of the battery (and load), will immediately rise to a somewhat higher uncoupled voltage level. More generally, the normally different uncoupled voltages of the solar panel and battery, as in the above example, are what are required for testing by the panel-battery tester 26 of the charging control apparatus C.

Returning to the above timer-caused opening, assuming the panel-battery tester 26 does not indicate that a closing should be prevented, the relay 20 will again close. Then, however, after a subsequent predetermined interval, the timer will again cause an opening of the relay. Subsequent periodic openings will continue as long as the battery-reference tester 16 does not indicate that the charging termination threshold has been reached, and the panel-battery tester 26, during such an opening, does not indicate that a re-closing should be prevented.

During a locking open of the relay 20 caused by the panel-battery tester 26, the timer 30, through its interaction with the battery-reference tester 16 is locked in a non-timing condition and any closing of the relay 20 which the timer would cause when operating, is eliminated.

Contact protector apparatus 34, shown in FIG. 1 in parallel with the relay 20, operates to place a fixed, low level voltage across the switch in the relay just prior to any opening or closing of the relay, to avoid degradation of the relay due to the arcing which might otherwise result from a substantially higher voltage across the switch contacts.

From the foregoing general description, it will be appreciated that the invention provides a capability to terminate the battery charging process automatically, without human intervention. In addition, it provides a capability to automatically prevent significant discharging of the battery B through the solar panel SP. In order to accomplish this latter prevention, it periodically breaks an extended connection between the output and charging terminal 24 of the solar panel and the output and whether such prevention is called for.

Figure 2A:
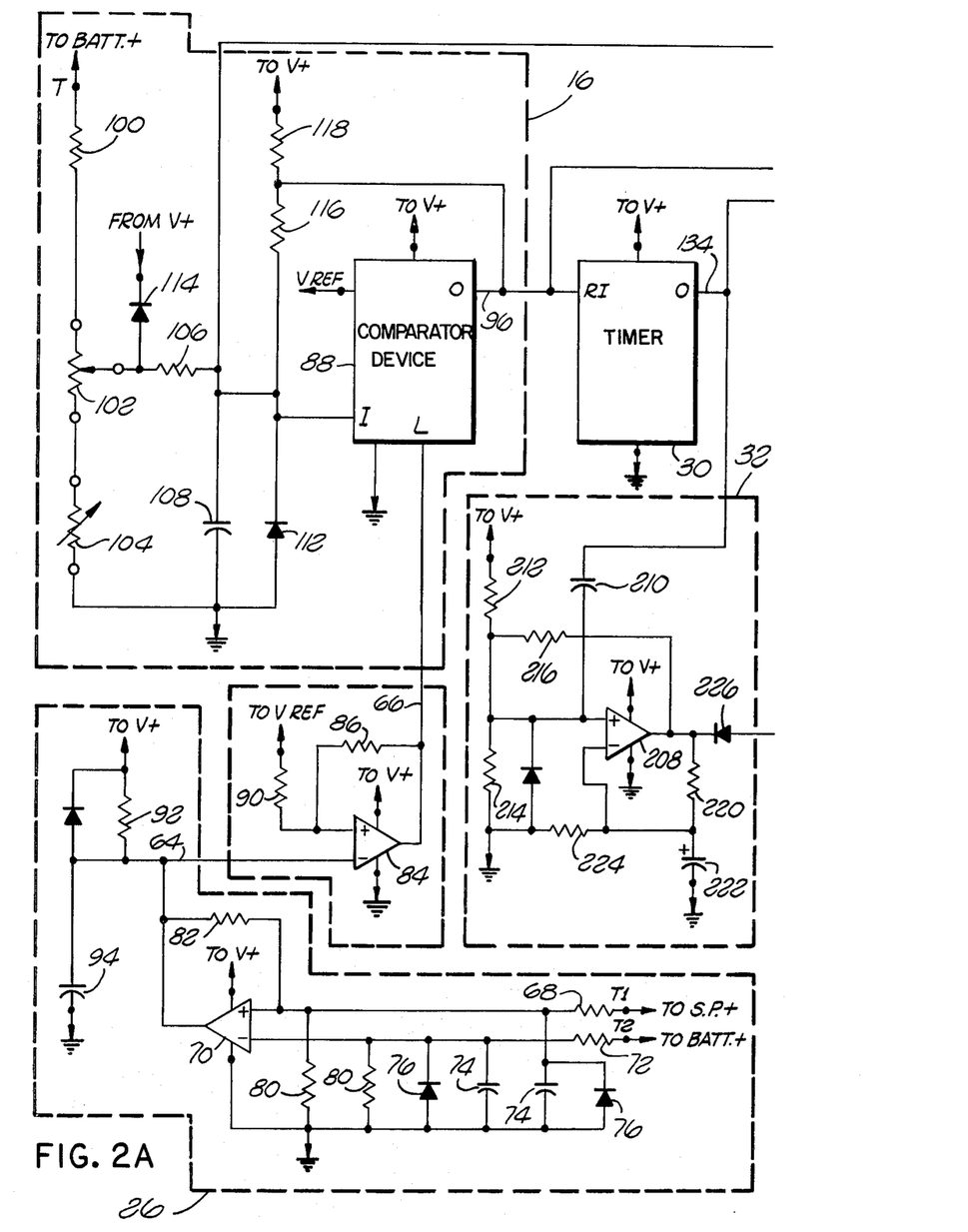
FIGS. 2A and 2B are schematic diagram of charging control apparatus incorporated into the conversion apparatus of FIG. 1.
Figure 2B:
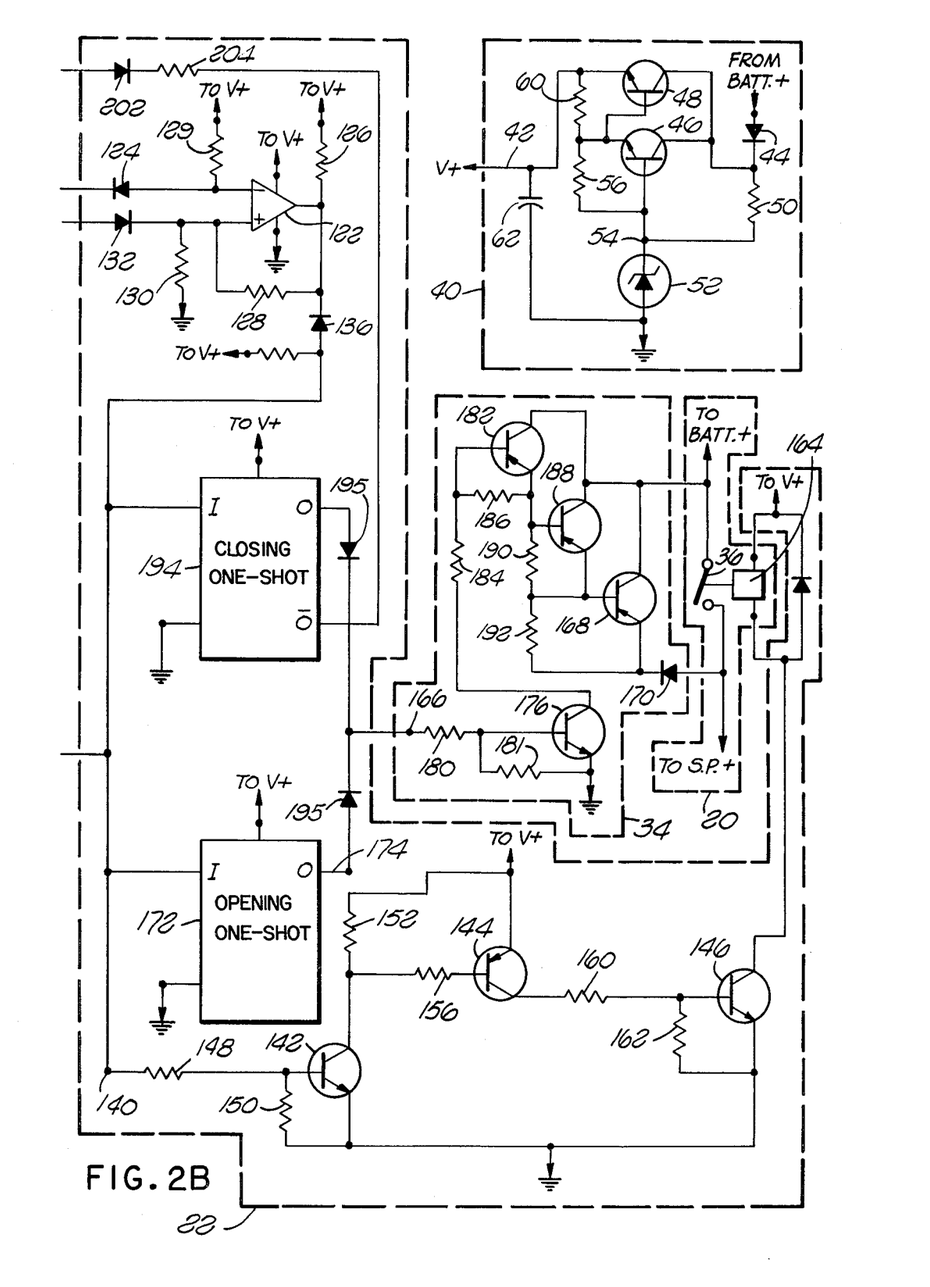

FIG. 2 shows the design of the charging control apparatus C in detail. Through it, the operation of the apparatus of FIG. 1, just generally described, may be understood in detail.

Now referring to FIG. 2, as a means for understanding the details of the apparatus, it is convenient to initially focus on the apparatus during a sequence of events which might typically occur. With this framework established, the complete operation of the apparatus is readily understood.

Therefore, it will initially be assumed that the switch 36 in the relay 20 is closed and the battery is being charged; that the (coupled) battery output voltage is, in keeping with this, below the charging termination threshold; that, absent the coupling, the voltage at the solar panel output and charging terminal 24 (FIG. 1) would be sufficiently high to permit the coupling; but that the battery output voltage is about to reach the charging termination threshold. Then, in sequence, it will be assumed that, after the switch 36 opens and the charging ceases, an energy drain from the battery to a load (not shown) within just a few minutes, causes the battery to lose substantial energy so as to leave the battery output voltage, during a coupling, substantially below the threshold. Thus charging is resumed. However, before the threshold again is reached, night falls, and, absent the coupling, the voltage at the solar panel output and charging terminal would not be sufficiently high to permit the coupling and, as a result, the switch becomes locked in the open position. In this regard, as will typically be the case, it is assumed that even during a heavy cloud cover, the design of the solar panel provides a sufficient voltage for any necessary charging. However, when night falls, there is insufficient voltage. Nevertheless, it should be apparent that the principles of operation of the charging control aparatus are fully applicable where this is not the case.

Before proceeding on the above basis, it is convenient to briefly focus on a voltage regulator 40 shown in FIGS. 1 and 2, as this regulator provides a power signal V+ over its regulator output line 42 to the various parts of the charging control apparatus C.

Referring to the voltage regulator 40, it receives the electrical output signal from the battery output and charging terminal 12 through a regulator input diode 44. The diode 44 is present to protect devices in the regulator from a mistaken connection of an unexpected low or negative voltage at the input to the regulator rather than the expected positive battery voltage. The signal from the battery acts as a biasing voltage for a pair of NPN regulator transistors 46 and 48, and also, through a regulator input resistor 50, as the excitation voltage for a zener diode 52, which at a zener diode terminal 54, provides a relatively constant voltage somewhat lower than the expected lowest battery voltage. This voltage is then lowered by the voltage drops across the two base-emitter junctions of the transistors, to the voltage presented over the regulator output line 42 as V+. Each of the transistors 46 and 48 is configured in conventional fashion with a base to emitter resistor 56 and 60, respectively, with the emitter of one of the transistors, which is driven by the voltage at the zener diode terminal 54, connected to provide the input to the base of the other transistor. A regulator capacitor 62 is connected between the output line 42 of the regulator and ground to store power at the desired voltage level V+ and establish the emitter voltage level at the second of the transistors 48.

The regulator, and the charging control apparatus, is in the nature of a load on the battery. However, its power requirements are small compared to the loads which the conversion apparatus of FIG. 1 is adapted to handle. Typically, the panel might provide in the range of 5 amperes in the midday sunshine, with the battery B taking in the range of 4 amperes for charging purposes and a load requiring in the range of 1 ampere. The choice of the charging termination threshold, of course, will, in straightforward, conventional fashion, take account of the expected loading and its effect on the battery-charging.

Now returning to the assumed sequence of events, with the switch 36 closed and the battery output voltage approaching the charging termination threshold, the input voltage from the battery output and charging terminal 12 to the testing input T of the battery-reference tester 16 is increasing. In addition, the voltage from the solar panel output and charging terminal 24 provided to the solar panel input T1 of the panel-battery tester 26 is the same as the voltage from the battery output and charging terminal 12 provided to the battery input T2 of that tester, as the terminals are directly connected to each other by the switch 36. These equal inputs cause the voltage at a panel-battery tester output line 64 to be at its high, as opposed to its low, output level. This high output level in turn causes the output voltage along a tester lock output line 66 to be low, so that the input level to the locking input L of the battery-reference tester 16 is low. This low level, as opposed to a high, locking level, permits the battery-reference tester 16 to interact with the timer 30 and with the relay and contact protector driver 22 in response to the output voltage of the battery at the battery charging and output terminal 12.

Concerning the panel-battery tester 26, the solar panel input T1 leads through a positive input resistor 68 to the positive input of a conventional comparator 70. Similarly, the battery input T2, through a negative input resistor 72, leads to the negative input of the comparator 70. Each of these resistors also leads to one of two identical shun capacitors 74, which are present to short out high frequency input noise, and also to one of two identical protector diodes 76, which protect the comparator 70 against a mistaken negative input at an input T1 or T2 thereto.

Each of these input resistors in addition forms a voltage divider with one of two identical input shunt resistors 80. As a result, by the choice of the values of the positive input resistor 68 and the negative input resistor 72, the (uncoupled) coupling prevention or locking ratio of the inputs may be selected. In the embodiment of FIGS. 1 and 2, adapted for such prevention or locking generally only as night falls, this ratio is selected to cause such prevention only after the uncoupled solar panel voltage has fallen somewhat below the uncoupled battery voltage. This will often result in some, limited discharging of the battery through the solar panel as night falls. However, this has been determined to be acceptable for the indicated type of operation, and also provides a desired cushion to prevent an uncoupling due to noise when the terminals are connected. In the particular embodiment, a prevention ratio of battery to solar panel voltage of about 1.3 was selected. Variations in this ratio will depend on the application.

The comparator 70 is provided with a feedback resistor 82 in conventional fashion to help drive the comparator from one state to the other state. In the embodiment of FIG. 2, the comparator is an integrated circuit. As with the other integrated circuits in this embodiment, it is adapted to, in its low state, provide a low output signal, and in its high state to provide what for present purposes may be viewed as an open circuit. Thus, after a transition from its low state to its high state, it will rise to the level of the voltage V+ of the power signal from the regulator 40. In accordance with the present sequence of events, it initially is assumed to be in this high state, resulting in the impressing of this high voltage at the negative input of a comparator 84 in the tester lock apparatus 28.

This latter comparator, which is identical to the former comparator in the battery-reference tester 26, is similarly provided with a comparator feedback resistor 86. A reference signal VREF generated by a comparator device 88 in the battery-reference tester 16, which is more sophisticated than the comparators 70 and 84, provides the input to the positive input of the lock apparatus comparator 84 through a positive input resistor 90. The reference voltage of this DC reference signal, VREF, is substantially less than the voltage of the power signal V+. Thus, under the present initially assumed circumstances, as previously indicated, the comparator lock output line 66 will be low. However, from the above, it should be evident that where the battery and solar panel terminals 12 and 24 (FIG. 1) are uncoupled and the inputs T1 and T2 to the panel-battery tester 26 result in a low output of the comparator 70 in this tester, the output line 66 of the tester lock apparatus 28 will be high.

A charging resistor 92 and delay capacitor 94 are connected to the negative input of the lock apparatus comparator 84 to provide a start-up sequence when the power signal V+ initially goes high. This will be addressed in more detail below. However, based on the foregoing, with an essentially instantaneous rise in the reference signal VREF and, due to the delay effects of the charging resistor 92 and delay capacitor 94, upon the initiation of such a start-up sequence, the lock apparatus output line 66 will become high and then, assuming the output of the comparator 70 in the battery-reference tester has become high, will go low. As will be addressed later, this places the charging control apparatus in its proper start-up mode.

Turning to the battery-reference comparator 16, the comparator device 88 therein, with its locking input L low, will provide an output signal along a battery-reference tester output line 96, which is low when the voltage level at the device's comparison input I is lower than the voltage level of its internally generated reference signal VREF. On the other hand, with its locking input L still low, it will provide a high output when the voltage level at its comparison input I becomes higher than the voltage level of the reference signal VREF. When the input voltage at its locking input L is high, however, the output of the comparator device 88 will lock at its high level. In the comparator device 88, the generated reference signal VREF is a temperature compensated signal, so that it provides a substantially constant DC reference signal level over a range of temperatures.

The indicated characteristics of the comparator device 88 are satisfied by the integrated circuit sold by the National Semiconductor Corporation under that company's designation LM2905N. Therefore, in the embodiment of FIG. 2, the comparator device 88 is implemented through this integrated circuit.

Now, again turning to the assumed sequence, with the battery output approaching its charging termination threshold, the battery-reference tester output signal is low. This is the case because a resistive ladder consisting of an initial ladder resistor 100, an intermediate ladder potentiometer 102 and a final ladder tempsistor 104 are chosen to provide a voltage at a comparator device input resistor 106 which rises to the level of the reference signal VREF voltage as the battery output voltage rises to the charging termination threshold. The input resistance looking from the potentiometer 102 toward the input resistor 106 is sufficiently high to permit the resistive ladder to effectively function as a voltage divider.

The tempsistor 104 is a temperature dependent resistor having a resistance which increases substantially linearly with temperature for the voltage and temperature range of interest. Such tempsistors are manufactured by Mid-West Components, Inc. Use of the temperature dependent tempsistor is desirable because the battery B, for a given charging current, is, due to its internal characteristics, expected to provide a voltage level, as its fully charged state is reached, which decreases with an increasing battery temperature. The increasing tempsistor resistance with temperature, therefore, can provide some compensation for this effect.

The comparator device 88 is conventionally provided with a shunt capacitor 108 to shunt out high frequency noise, a negative level protector diode 112 as protection against a mistaken negative connection at the input T of the battery-reference tester 16, and a positive level protector diode 114, for protection against a mistaken, abnormally high input voltage to such input. It is similarly provided, in conventional fashion, with a feedback resistor 116 between its output O and comparison input I, and a separation resistor 118 to separate its output from the power signal V+. It will be appreciated that the battery-reference tester 16 undertakes its testing of the voltage of the battery output signal by, essentially, undertaking a division of the voltage level of the battery output signal through the tester's resistive ladder and then by comparing the divided voltage level with the voltage level of the reference signal VREF.

Now, proceeding with the assumed sequence of events, as the battery charges, causing the voltage level at the input I of the comparator device 88 to reach and pass the level of the reference signal VREF, the battery-reference tester output signal (also the comparator device output signal) goes high. This is represented by the high transition 119 along an illustrative battery-reference tester output signal 120 shown in FIG. 3. This causes the formerly low input from the comparator device 88 to the negative input of a comparator 122 in the relay and contact protector driver 22, through a negative input diode 124, to go high.

This driver comparator 122 is identical to the two previously-described comparators 70 and 84. It is provided with a separation resistor 126 between its output and the power signal V+, and with a feedback resistor 128 to help drive its transitions. It is also provided with a negative input shunt resistor 129 between its negative input and the power signal V+, and with a positive input shunt resistor 130 between its positive input and ground. This surrounding circuitry, along with a positive input diode 132 between the output line 134 of the timer 30 and the positive input of the comparator 122, causes the comparator to function as in the nature of a latch. Upon a transition to a high level by the battery-reference tester output, with, as will always be the case when this occurs, the timer output line 134 low or making a transition to low, a high output at the driver comparator 122 will become low. In addition, it will remain low until the output line of the timer undergoes a transition to a high level with, as will always be the case when such a transition occurs, the battery-reference tester output low.

The output of the driver comparator 122 is connected through a driver comparator output diode 136 to a driving terminal 140 for a group of three cascaded driver transistors. Each of these transistors, an initial NPN transistor 142, an intermediate PNP transistor 144 and a final NPN transistor 146 is in a conventional configuration. Thus, starting at the driving terminal 140, there is an initial transistor input resistor 148 between the driving terminal and the base of the initial transistor 142, a base to emitter resistor 150 for the initial transistor, and an initial transistor collector resistor 152 between the collector of the initial transistor and the power signal V+; the intermediate transistor 144 takes its input from the collector of the initial transistor through an intermediate transistor input resistor 156, with its emitter connected to the power signal V+; and the final transistor 146, with a final transistor input resistor 160 and a base to emitter resistor 162, receives its input from the collector of the intermediate transistor. The resistances and transistor interactions are such that when the voltage at the driving terminal 140 is high, the initial transistor is saturated, it is driving the intermediate transistor at saturation thereof, and the intermediate transistor is driving the final transistor at saturation of the final transistor. The resulting current into the collector of the final transistor, through a solenoid element 164 in the relay 20, will then be sufficient to cause the solenoid element to maintain the switch 36 in the relay, closed. When on the other hand, the driving terminal 140 is low, each of the transistors is in its non-driving state, and the switch 36 will be open. Therefore, to maintain the switch closed, the driving terminal 140 must be high; similarly, to maintain the driving terminal 140 high, the output of the driver comparator 122 must be high.

Continuing with the assumed sequence of events, prior to the transistion to high at the output of the comparator device 88, the driver comparator 122 will be latched in its high state, with the switch 36 in the relay 20 closed. However, with the transition, the output of the driver comparator 122 will go low, clamping the driving terminal 140 low through the driving comparator output diode 136. As a result, the high level driving current to the solenoid element 164 will no longer be present, the switch 36 will open, and the battery output and charging terminal 12 (see FIG. 1) will no longer be coupled through the switch 36 to the solar panel output and charging terminal 24 (see FIG. 1). Therefore, the charging of the battery will be terminated.

There is an additional event associated with the low transition of the output of the driver comparator 122 and the resulting opening of the switch 36 which deserves mention. It relates to the role and operation of the contact protector 34.

Just prior to when the switch 36 opens during the sequence of events, the solar panel may be providing a substantial current through the switch 36 to the battery B. In the absence of an alternate route for this current while the switch is opening, there is a danger of an arcing across the gap as the switch opens, and over a period of time, of a resulting degradation of the switch 36 and relay 20. This situation is addressed by the excitation of a contact protector terminal 166 with a high excitation pulse commencing just prior to the opening of the switch and extending for a short period after the opening process has been completed.

During such an excitation pulse, four cascaded transistors in the contact protector 34 become activated. As a result of such activation, a final contact protector PNP transistor 168 is saturated, placing a saturation level collector-emitter voltage between the battery output and a separation diode 170 which in turn leads to the solar panel output. Simultaneously, this transistor, through its emitter, can accept a large current from the solar panel, and thus eliminate the potential for an arcing during the opening of the switch.

The excitation to a high level of the contact protector terminal 166 is accomplished by an opening one-shot 172, which is triggered by the falling edge of the output of the driver comparator 122. This falling edge causes the one-shot to provide a high pulse along its output line 174. The response of the one-shot and of the contact protector is suffficiently fast to achieve the protective effect prior to the commencement of the opening of the switch. In addition, in the embodiment of FIG. 2, a pulse lasting approximately 25 milliseconds has been found to be sufficiently long to achieve the desired result.

Referring to the contact protector 34, it includes an initial NPN transistor 176 provided with an initial transistor input resistor 180 and a base to emitter resistor 181. This initial transistor drives a first, intermediate PNP transistor 182 through a first, intermediate PNP transistor input resistor 184 connected between the collector of the initial transistor and the base of the first, intermediate transistor. The first, intermediate transistor is also provided with a base to emitter resistor 186. The first, intermediate transistor 182 in turn drives a second, intermediate PNP transistor 188 through the connection of the emitter of the former transistor to the base of the latter transistor, which latter transistor is also provided with a base to emitter resistor 190. Finally, the final transistor 168 is driven through the connection of its base to the emitter of the second, intermediate transistor, with the final transistor 168 also being provided with a base to emitter resistor 192. During the input pulse at the contact protector terminal 166, these transistors become saturated to provide the desired contact protection. When the input at the contact protector terminal 166 is low, the contact protector essentially has no effect upon the solar panel, battery or relay.

A closing one-shot 194 operates in a comparable fashion along a rising edge to a high level at the driving terminal 140 and a resulting closing of the switch 36. It causes an excitation pulse at the contact protector terminal 166 upon a closing of the switch, to protect against an arcing during the closing process. A pulse for the closing one-shot 194, lasting about 75 milliseconds has been found satisfactory in the embodiment of FIG. 2. Two channeling diodes 195, one connected between the output of each of the one-shots and the contact protector terminal 166, provide the necessary electrical separation between such outputs and the terminal.

In the present embodiment, both one-shots have been satisfactorily implemented by using an integrated circuit known by the general designation 74C221J, provided with the necessary timing resistors and capacitors to achieve the desired pulse length.

Continuing with the assumed sequence of events through which the operation of the charging control apparatus is being described, the stage in this sequence has now been reached when the switch 36 has been opened to terminate the charging of the battery by the solar panel. Upon the opening of the switch and the termination of the charging, the output voltage of the battery B will, to some degree, drop. This is due to the well-understood, internal characteristics of the battery B. For example, in typical circumstances, one might expect the voltage level at the solar panel and battery outputs, when they are connected, and the battery is approaching the charging termination threshold, to be in the range of 15 volts. Then, upon the opening of the switch, typically, the battery might drop several volts, while the solar panel output voltage might rise several volts. These levels are provided merely to illustrate an effect that is utilized by the charging control apparatus.

In the present sequence of events, following the opening of the relay, as a result of the decrease in the battery output voltage at the now, uncoupled battery output and charging terminal 12, the voltage at the battery-reference tester input T will fall below the level necessary to maintain the output of the comparator device 88 high. As a result, this output, upon the opening of the relay, just after it has gone high, will again become low. This is represented by the falling edge 196 along the illustrative battery-reference tester output signal 120 of FIG. 3.

The immediately preceding rising edge of this signal 119, by virtue of its being provided to the reset input RI of the timer 30, resets the timer. The return to the low level by this signal then, almost immediately, enables the timer to begin timing. In the embodiment of FIG. 2, the timer 30, operating in the fashion described herein, is implemented by employing a binary counter. In particular, an integrated circuit known under the general designation CD4060BCJ, clocked by capacitor-resistor circuitry connected thereto in conventional fashion is employed. Through the use of the binary counter and the clocking circuitry, in the embodiment of FIG. 2, the timer, upon being enabled to time, remains low for approximately 14 minutes, then goes high and remains high for approximately 14 minutes, and then returns low again for approximately 14 minutes, and so on until the timer is reset by a high input. Upon being reset, it becomes or remains low and only starts timing again, upon being enabled with a low input. The chosen interval of course could be varied in accordance with the requirements of the particular situation.

Under the present illustrative sequence of events, it is assumed that subsequent to the relay being opened, the battery undergoes a rather rapid energy drain which will require extended recharging to replace; however, during such recharging, before the charging termination threshold is reached, night falls.

An illustrative timer output signal 198 for this sequence, commencing with the above enabling of the timer, following the resetting thereof upon the opening of the relay, is shown in FIG. 3. As indicated, after being reset and enabled to time, the timer output signal 198 remains low for the chosen timing interval which, for clarity and ease of description and understanding, will be assumed, as in the present embodiment, to be about 14 minutes.

As shown in FIG. 3, after the initial 14 minutes, the timer output signal 198 goes high along a first leading edge 200 thereof. By reference to the previous description of the operation of the driver comparator 122 and its related circuitry, it should be apparent that this transition to a high level will cause the comparator output to move from a low to a high state, and latch at that high state. As a result, the voltage at the driving terminal 140 of the charging control apparatus will go high, closing the switch 36. In addition, while the relay is being closed, the closing one-shot 194 will excite the contact protector terminal 166, and the contact protector will perform its protective function, as previously outlined.

On the closing of the switch in a situation like this, it has been found that an instability occurs at the input T of the battery-reference tester 16. During the instability, typically, the input T will, for a short period, take on a high voltage in the range of the uncoupled solar panel output voltage. if not addressed, the result of this, in the present situation, would in effect be an erroneous indication to the comparator device 88 that the charging termination threshold has been exceeded. To prevent this, the complement output $\overline{O}$ is taken from the closing one-shot 194 to provide, during such an instability, a low voltage to the input of the comparator device 188 through a closing one-shot feedback diode 202 and feedback resistor 204. Thus, during a closing of the relay, while the one-shot is providing a high pulse to the contact protector terminal 166, it also provides a low pulse to maintain the output of the comparator device 88 low during any closing instability. As a result, under the assumed sequence, the illustrative battery-reference output signal 120 of FIG. 3 remains low.

Now, again referring to the timer output signal of FIG. 3, 14 minutes after the switch 36 closes and the recharging begins, the timer output will go low along a first falling edge 206 of the signal. This will not affect the output of the driving comparator 122, as it has been latched high. However, it will have an important operational effect on the breaker 32 which will result in opening of the switch 36.

The positive input of a breaker comparator 208 is connected to the output of the timer 30 through a breaker blocking capacitor 210. This capacitor effectively blocks out an established DC level at the timer output. Given such an established DC level, e.g., along a low or high interval along the counter output signal of FIG. 3, the breaker 32 operates essentially independently of the timer output. Given such an established stable situation, the voltage at the output of the breaker comparator 208 will be high. This high output is established by a separation resistor 212 between the power signal V+ and the positive input of the comparator; a positive input shunt resistor 214 between the positive input and ground; a feedback resistor 216 between the comparator output and the positive input; and a comparator output resistor 220 and output capacitor 222 in series between the output and ground. These devices, along with a negative input resistor 224 between the negative input of the comparator and ground, are chosen to provide the desired high output in such a stable situation.

A low to high transition at the output of the timer 30, leading from one stable DC situation to another does not alter the high output of the breaker comparator 208. However, a high to low transition, e.g., along the first falling edge 206 in FIG. 3, does cause a transition at the output of the breaker comparator 208 from high to low. This low output is maintained until the breaker output capacitor 222 discharges sufficiently to bring the negative input of the breaker comparator 208 to a level lower than the positive input, and thus reestablishes a high output. In the present embodiment, about a one second low output is used. This low output, through a breaker comparator output diode 226, clamps the driving terminal 140 low until the output again becomes high.

In accordance with the previously described operation of the charging control apparatus, the resulting transition from high to low at the driving terminal 140 will result in an opening of the switch 36, along with a triggering of the opening one-shot 172 and of the contact protector 34. While the switch is open, the panel-battery tester 26 can operate through the tester lock 28 to force the output of the comparator device 88 high and lock it high if the solar panel and battery output voltages, when they are disconnected, force the output of the battery-reference comparator 70 low. However, under the assumed sequence of events and conditions, this does not occur, and charging continues for an extended period of time, until night falls. Thus, when the output of the breaker comparator 208 returns to high, the switch 36 will again close while the closing one-shot 194 triggers the contact protector 34 and temporarily maintains the input of the comparator device 88 low in the manner previously described.

In FIG. 3, the timer output signal 198 and the battery-reference tester output signal 120 (including the omitted portions therealong, meaning more of the same), indicate a repetition of the just-indicated occurrence—i.e., an opening and closing of the switch 36—at 28 minute intervals following the first falling edge 206 along the timer output signal. The first opening and closing, of course, occurred 14 minutes after the initial closing. This is all in accordance with the assumed sequence and conditions.

Still referring to FIG. 3, between the time of a second-to-last opening and closing (along the omitted portions of the signals) and a final opening and closing (after the omitted portions), it is assumed that, although the charging termination threshold has not been reached, night, as it is to be detected by the charging control apparatus, has fallen. As a result, along a final falling edge 228 of the timer output signal 198, the switch 36 opens, the panel-reference tester 26 detects panel and battery output voltages causing a low transition by its comparator 70, the lock apparatus comparator 80 goes high, and the output of the comparator device 88 in the battery-reference tester 16 makes a transition from low to high and is locked high. Due to the comparator device transition and locking, the driver comparator 122 makes a transition to its low state and latches in that state, and the switch 36 is maintained open by the latched low state of the driver comparator.

In addition, although the timer 30 will have been reset, it will not be enabled to begin timing again because of the high output from the comparator device 88 to the reset input of the timer. However, when the night-time situation, as detected by the charging control apparatus, ends, i.e., the next morning, the device comparator 88 will become unlocked, and the timer will begin timing. Then, approximately 14 minutes later, the timer output will become high, causing the switch 36 to close and the charging of the battery to begin again.

The above illustrative sequence of events has provided an understanding of the details of the operation of the charging control apparatus. It indicates the operation of the apparatus during the various possible occurrences. For example, while the relay is closed, any time the charging termination threshold is reached, the result will be an opening of the switch 36, a resetting of the timer 134, enablement of the timer for timing and the commencement of such timing. Then, if along the first rising edge of the timer output signal, upon a closing of the relay 36, the charging termination threshold is still being exceeded, the relay will be immediately reopened by the output of the comparator device 88, and the timer will be reset and again begin timing. Similarly, a transition, while the relay is closed, to a coupling prevention configuration by the solar panel and battery, along the next falling edge of the timer output signal, will result in an opening of the relay 36, and a locking of the apparatus. Following any unlocking of the apparatus, a testing for the charging termination threshold begins upon an initial closing of the switch 36 along the initial rising edge of the timer output signal.

It was previously mentioned that the tester lock apparatus 28, upon an initial connection of the power signal V+, in a desired start-up sequence, first provides a high output to the locking input of the comparator device 88, followed, after the panel-reference comparator 70 has become high, by a low output as the delay capacitor 94 in the panel-battery comparator 26 charges up. This may now be appreciated from the fact that this will insure that the driver comparator 122 will be latched in its low condition to provide an open switch 36, and result in a resetting of the timer followed by the commencement of timing by the timer.

Of some peripheral interest, in the particular embodiment of FIG. 2, the requirements for the four comparators 70, 84, 122 and 208 in the charging control apparatus are conveniently satisfied by the integrated circuit known by the general designation LM239J. It is also noteworthy that although the embodiment of FIG. 2 was specifically designed to allow for an uncoupled battery output voltage from about 14 volts to 18 volts, the design of FIG. 2 has widespread applicability to the charging of a battery by a solar panel.

Finally, it will be appreciated that many variations and modifications may be made in the described embodiment of solar to electrical energy conversion apparatus, including the charging control apparatus therein, without departing from the spirit and scope of the invention.

What is claimed is:

1. Apparatus for controlling the charging of a rechargeable electrical energy storage device for generating a storage device electrical signal, by a variable output electrical energy source for generating a source electrical signal, said source having a charging output terminal and said device having a charging input terminal, said source electrical signal being dependent upon the electrical device or devices that are electrically coupled to said charging output terminal, said apparatus comprising:
- relay means for electrically coupling the charging output terminal of the source and the charging input terminal of the device to permit said charging;
- signal-testing means coupled to said relay means for receiving the storage device electrical signal and the source electrical signal to test said signals and provide an electrical output signal for permitting and preventing said coupling in response to said signals;
- relay breaker means coupled to said relay means for providing an electrical breaker signal for breaking said coupling after said coupling for a predetermined period of time to permit said testing of said signals to include said source electrical signal in the absence of said coupling; and
- relay driver means coupled to said relay means for providing an electrical control signal for controlling said coupling in response to said output signal of said signal-testing means and said relay breaker signal.

2. Charging control apparatus as defined in claim 1 wherein said controlling of said coupling includes reestablishing said coupling in response to said output signal of said signal-testing means upon said breaking.

3. Charging control apparatus as defined in claim 2 wherein said breaking is during said permitting by said output signal of said signal-testing means.

4. Charging control apparatus as defined in claim 1 for controlling the charging of a rechargeable electrical energy storage device for generating a storage device electrical signal indicative of the level of charging of the device, further comprising additional signal-testing means for receiving the storage device electrical signal to test the level of charging of the device and for providing an electrical output signal for terminating said coupling in response to said testing.

5. Charging control apparatus as defined in claim 4 wherein said relay means includes a switch for directly connecting the charging input terminal of the storage device and the charging output terminal of the source to provide said coupling and to establish substantially the same voltage level at said terminals during said coupling.

6. Charging control apparatus as defined in claim 1 wherein said relay means includes a switch for directly connecting the charging input terminal of the storage device and the charging output terminal of the source to provide said coupling and to establish substantially the same voltage level at said terminals during said coupling.

7. Solar to electrical energy conversion apparatus, comprising:
- a solar panel for receiving and converting solar energy to electrical energy, and for generating a solar panel electrical signal in response to said solar energy, said solar panel having a charging output terminal;
- a rechargeable electrical energy storage device for generating a storage device electrical signal, said storage device having a charging input terminal;
- relay means for electrically coupling said charging output terminal of said solar panel and said charging input terminal of said storage device to permit said solar panel to charge said storage device;
- signal-testing means coupled to said relay means for receiving the storage device electrical signal and the solar panel electrical signal and for providing an electrical output signal for permitting and preventing said coupling in response to said signals;
- relay breaker means coupled to said relay means for providing an electrical breaker signal for breaking said coupling after said coupling for a predetermined period of time to permit said signal-testing means to respond to said solar panel electrical signal in the absence of said coupling for said permitting and preventing; and
- relay driver means coupled to said relay means for providing an electrical control signal for controlling said coupling in response to said output signal of said signal-testing means and said relay breaker signal.

8. Energy conversion apparatus as defined in claim 7 wherein said controlling of said coupling includes reestablishing said coupling in response to said output signal of said signal-testing means upon said breaking.

9. Energy conversion apparatus as defined in claim 8 wherein said breaking is during said permitting by said output signal of said signal-testing means.

10. Energy conversion apparatus as defined in claim 7 wherein:
- said solar panel charging output terminal is connected to provide said solar panel electrical signal;
- said storage device charging input terminal is connected to provide said storage device electrical signal; and
- said signal-testing means is connected to receive said solar panel electrical signal at said solar panel charging output terminal, and to receive said storage device electrical signal at said storage device charging input terminal during said coupling and in the absence of said coupling.

11. Energy conversion apparatus as defined in claim 7 wherein said storage device electrical signal is indicative of the level of charging of said device, further comprising additional signal testing means for receiving said storage device electrical signal to test the level of charging of said device and for providing an electrical output signal for terminating said coupling in response to said testing.

12. Energy conversion apparatus as defined in claim 11 wherein said relay means includes a switch for directly connecting said charging input terminal of said storage device and said charging output terminal of said solar panel to provide said coupling and to establish substantially the same voltage level at said terminals during said coupling.

13. Energy conversion apparatus as defined in claim 7 wherein said relay means includes a switch for directly connecting said charging input terminal of said storage device and said charging output terminal of said solar panel to provide said coupling and to establish substantially the same voltage level at said terminals during said coupling.

14. A method of controlling the charging of a rechargeable electrical energy storage device for generating a storage device electrical signal, by a variable output electrical energy source for generating a source electrical signal, said source having a charging output terminal and said device having a charging input terminal, said source electrical signal being dependent upon the electrical device or devices that are electrically coupled to said charging output terminal, said method comprising the steps of:
  electrically coupling the charging output terminal of the source and the charging input terminal of the storage device to permit said charging;
  maintaining said coupling;
  generating an electrical tester signal responsive to testing the device and source electrical signals;
  generating an electrical breaker signal responsive to said maintaining of said coupling for a predetermined period of time;
  breaking said coupling after said maintaining of said coupling for said predetermined period of time in response to said breaker signal to permit said testing of said signals to include said source electrical signal in the absence of said coupling;
  preventing the reestablishing of said electrical coupling of the charging output terminal of the source and the charging input terminal of the device in response to said tester signal during said testing after said breaking of said coupling; and
  permitting the reestablishing of said electrical coupling of the charging output terminal of the source and the charging input terminal of the device in response to said tester signal.

15. The charging control method as defined in claim 14 wherein said coupling, maintaining, breaking, preventing and permitting steps occur automatically.

16. The charging control method as defined in claim 14 wherein said coupling, maintaining, breaking, preventing and permitting steps occur electronically, without human intervention.

17. The charging control method as defined in claim 14 of controlling the charging of a rechargeable electrical energy storage device for generating a storage device electrical signal indicative of the level of charging of the device, including the additional steps of:
  generating an additional electrical tester signal responsive to the device electrical signal and the level of charging of the device indicated by the device electrical signal; and
  terminating a subsequent electrical coupling of the charging output terminal of the source and the charging input terminal of the storage device in response to the additional electrical tester signal.

18. The charging control method as defined in claim 17 wherein:
  said coupling step includes establishing substantially the same voltage level at the terminals;
  said permitting step includes permitting the reestablishing of substantially the same voltage level at the terminals; and
  said terminating a subsequent electrical coupling step includes terminating a subsequent electrical coupling establishing substantially the same voltage level at the terminals.

19. The charging control method as defined in claim 17 wherein said coupling, maintaining, breaking, preventing, permitting and terminating steps occur automatically.

20. The charging control method as defined in claim 17 wherein said coupling, maintaining, breaking, preventing, permitting and terminating steps occur electronically, without human intervention.

21. The charging control method as defined in claim 14 wherein:
  said coupling step includes establishing substantially the same voltage level at the terminals;
  said maintaining step includes maintaining substantially the same voltage level at the terminals; and
  said permitting step includes permitting the reestablishing of substantially the same voltage level at the terminals.

22. Apparatus for controlling the charging of a rechargeable electrical energy storage device for generating a storage device electrical signal by a variable output electrical energy source for generating a source electrical signal, said source having a charging output terminal and said device having a charging input terminal, said source electrical signal being dependent upon the electrical device or devices that are electrically coupled to said charging output terminal, said apparatus comprising:
  relay means for electrically coupling the charging output terminal of the source and the charging input terminal of the device to permit said charging through said relay means;
  signal-testing and coupling selector means coupled to said relay means for receiving the storage device electrical signal and the source electrical signal to test said signals and provide an electrical output signal for selecting said coupling or the absence of said coupling in response to said signals;
  relay breaker means coupled to said relay means for providing an electrical breaker signal for breaking said coupling after said coupling for a predetermined period of time to permit said testing of said source electrical signal in the absence of said coupling; and
  relay driver means coupled to said relay means for providing an electrical control signal for controlling said coupling in response to said output signal of said signal-testing and coupling selector means and said relay breaker signal.

23. Charging control apparatus as defined in claim 22 wherein said controlling of said coupling includes reestablishing of said coupling in response to said output signal of said signal-testing and coupling selector means upon said breaking.

24. Charging control apparatus as defined in claim 22 wherein said relay means includes a switch for directly connecting the charging input terminal of the storage device and the charging output terminal of the source to provide said coupling and to establish substantially the same voltage level at said terminals during said coupling.

25. Solar to electrical energy conversion apparatus, comprising:
  a solar panel for receiving and converting solar energy to electrical energy, and for generating a solar panel electrical signal in response to said solar energy, said solar panel having a charging output terminal;
  a rechargeable electrical energy storage device for generating a storage device electrical signal, said storage device having a charging input terminal;
  relay means for electrically coupling said charging output terminal of said solar panel and said charging input terminal of said storage device to permit said solar panel to charge said storage device through said relay means;

signal-testing and coupling selector means coupled to said relay means for receiving the storage device electrical signal and the solar panel electrical signal and for providing an electrical output signal for selecting said coupling or the absence of said coupling in response to said signals;

relay breaker means coupled to said relay means for providing an electrical breaker signal for breaking said coupling after said coupling for a predetermined period of time to permit said signal-testing and coupling selector means to respond to said solar panel electrical signal in the absence of said coupling for said selecting; and relay driver means coupled to said relay means for providing an electrical control signal for controlling said coupling in response to said output signal of said signal-testing and coupling selector means and said relay breaker signal.

26. Energy conversion apparatus as defined in claim 25 wherein said controlling of said coupling includes reestablishing said coupling in response to said output signal of said signal-testing and coupling selector means upon said breaking.

27. Energy conversion apparatus as defined in claim 25 wherein:
said solar panel charging output terminal is connected to provide said solar panel electrical signal;
said storage device charging input terminal is connected to provide said storage device electrical signal; and
said signal-testing and coupling selector means is connected to receive said solar panel electrical signal at said solar panel charging output terminal, and to receive said storage device electrical signal at said storage device charging input terminal during said coupling and in the absence of said coupling.

28. Energy conversion apparatus as defined in claim 25 wherein said relay means includes a switch for directly connecting said charging input terminal of said storage device and said charging output terminal of said solar panel to provide said coupling and to establish substantially the same voltage level at said terminals during said coupling.

29. A method of controlling the charging of a rechargeable electrical energy storage device for generating a storage device electrical signal, by a variable output electrical energy source for generating a source electrical signal, said source having a charging output terminal and said device having a charging input terminal, said source electrical signal being dependent upon the electrical device or devices that are electrically coupled to said charging output terminal, said method comprising the steps of:

electrically coupling the charging output terminal of the source and the charging input terminal of the storage device to permit said charging through the electrical path of said coupling;

maintaining said coupling;

generating an electrical selector signal responsive to testing the device and source electrical signals;

generating an electrical breaker signal responsive to said maintaining of said coupling for a predetermined period of time;

breaking said coupling after said maintaining of said coupling for said predetermined period of time in response to said breaker signal to permit said testing of said source electrical signal in the absence of said coupling;

maintaining the absence of said coupling in response to said selector signal during said testing after said breaking of said coupling; and reestablishing said coupling in response to said selector signal.

30. The charging control method as defined in claim 29 wherein said coupling, maintaining said coupling, breaking, maintaining the absence of said coupling and reestablishing steps occur automatically.

31. The charging control method as defined in claim 29 wherein said coupling, maintaining said coupling, breaking, maintaining the absence of said coupling and reestablishing steps occur electrically, without human intervention.

32. The charging control method as defined in claim 29 wherein:
said coupling step includes establishing substantially the same voltage level at the terminals;
said maintaining said coupling step includes maintaining substantially the same voltage level at the terminals; and
said reestablishing step includes the reestablishing of substantially the same voltage level at the terminals.

* * * * *

UNITED STATES PATENT AND TRADEMARK OFFICE
CERTIFICATE OF CORRECTION

PATENT NO. : 4,453,119
DATED : June 5, 1984
INVENTOR(S) : TERRY STALER et al.

It is certified that error appears in the above-identified patent and that said Letters Patent are hereby corrected as shown below:

IN THE HEADING:

Please add:

--Assignee: Atlantic Richfield Company, Los Angeles, Calif.-- and

--Attorney, Agent or Firm - Nilsson, Robbins, Dalgarn, Berliner, Carson & Wurst--

Signed and Sealed this

Twenty-second Day of January 1985

[SEAL]

Attest:

DONALD J. QUIGG

Attesting Officer     Acting Commissioner of Patents and Trademarks